United States Patent
Nakai et al.

(10) Patent No.: US 11,592,922 B2
(45) Date of Patent: Feb. 28, 2023

(54) INPUT DEVICE AND SOUND OUTPUT SYSTEM

(71) Applicant: PANASONIC INTELLECTUAL PROPERTY MANAGEMENT CO., LTD., Osaka (JP)

(72) Inventors: Jun Nakai, Kanagawa (JP); Takashi Okohira, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 276 days.

(21) Appl. No.: 17/028,394

(22) Filed: Sep. 22, 2020

(65) Prior Publication Data

US 2021/0004116 A1     Jan. 7, 2021

Related U.S. Application Data

(63) Continuation of application No. PCT/JP2019/013484, filed on Mar. 27, 2019.

(30) Foreign Application Priority Data

Mar. 29, 2018 (JP) .............................. JP2018-066240

(51) Int. Cl.
*G06F 3/041* (2006.01)
*G06F 3/01* (2006.01)
(Continued)

(52) U.S. Cl.
CPC ............ *G06F 3/0414* (2013.01); *G06F 3/016* (2013.01); *G06F 3/0416* (2013.01); *G06F 3/16* (2013.01); *H04R 3/04* (2013.01); *H04R 2430/01* (2013.01)

(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS

2007/0229476 A1* 10/2007 Huh .................... G09G 5/26
                                                               345/173
2010/0082274 A1*  4/2010 Son .................... G01H 1/00
                                                                702/56
(Continued)

FOREIGN PATENT DOCUMENTS

JP      2006-215738      8/2006
JP      2013-008118      1/2013
(Continued)

OTHER PUBLICATIONS

International Search Report (ISR) from International Searching Authority (Japan Patent Office) in International Pat. Appl. No. PCT/JP2019/013484, dated May 28, 2019, along with an English translation thereof.

(Continued)

*Primary Examiner* — William Lu
(74) *Attorney, Agent, or Firm* — Greenblum & Bernstein, P.L.C.

(57) ABSTRACT

An input device includes: a touch device configured to receive a user operation; an actuator configured to apply a vibration corresponding to a drive voltage to the touch device; and a processor. The processor is configured to: apply a first voltage to the actuator to vibrate the touch device with a first vibration in response to a touch-down during a touch operation, the touch-down in which a pressing force of a predetermined value or more is detected from start of touch to the touch device; and apply a second voltage lower than the first voltage to the actuator to vibrate the (Continued)

touch device with a second vibration in response to a touch release during the touch operation, the touch release in which a pressing force of a value lower than the predetermined value after the touch-down is detected.

17 Claims, 7 Drawing Sheets

(51) Int. Cl.
*G06F 3/16* (2006.01)
*H04R 3/04* (2006.01)

(56) References Cited

U.S. PATENT DOCUMENTS

| | | | | |
|---|---|---|---|---|
| 2010/0156823 | A1* | 6/2010 | Paleczny | G06F 3/016 345/173 |
| 2010/0309141 | A1* | 12/2010 | Cruz-Hernandez | G06F 3/016 345/173 |
| 2011/0163984 | A1* | 7/2011 | Aono | G06F 3/0416 345/173 |
| 2012/0023411 | A1* | 1/2012 | Ryu | G06F 9/452 715/740 |
| 2012/0274662 | A1* | 11/2012 | Kim | G11B 27/10 345/650 |
| 2013/0099854 | A1* | 4/2013 | Richards | H02M 1/44 327/551 |
| 2014/0323053 | A1* | 10/2014 | Yamaoka | H04M 1/72412 455/41.2 |
| 2015/0086046 | A1* | 3/2015 | Oh | G06F 3/167 381/151 |
| 2015/0253851 | A1* | 9/2015 | Oh | G06F 3/04883 345/179 |
| 2016/0142529 | A1* | 5/2016 | Lee | H04M 1/72454 455/550.1 |
| 2017/0046123 | A1* | 2/2017 | Song | H04S 7/30 |
| 2017/0087458 | A1* | 3/2017 | Nakagawa | A63F 13/54 |
| 2017/0205883 | A1* | 7/2017 | Tanaka | G06F 3/041 |
| 2018/0059857 | A1* | 3/2018 | Kumada | G06F 3/0234 |

FOREIGN PATENT DOCUMENTS

| | | |
|---|---|---|
| JP | 2013-531323 | 8/2013 |
| JP | 5597452 | 10/2014 |
| JP | 2016-170766 | 9/2016 |
| JP | 2018-036959 | 3/2018 |
| WO | 2015/145893 | 10/2015 |

OTHER PUBLICATIONS

Written Opinion (WO) from International Searching Authority (Japan Patent Office) in International Pat. Appl. No. PCT/JP2019/013484, dated May 28, 2019, along with an English translation thereof.

* cited by examiner

INPUT DEVICE AND SOUND OUTPUT SYSTEM

CROSS-REFERENCE TO RELATED APPLICATIONS

This application is a continuation of PCT International Patent Application No. PCT/JP2019/013484 filed on Mar. 27, 2019, which claims the benefit of priority of Japanese Patent Application No. 2018-066240 filed on Mar. 29, 2018, the enter contents of which are incorporated herein by reference.

FIELD

The present disclosure relates to an input device and a sound output system that support an input operation.

BACKGROUND

An electronic device such as a smartphone and a tablet terminal has been able to display various applications on a screen of a relatively small display device and improved in operability, by arranging a touch panel on the display device to enable a touch operation.

In an input device that receives a touch operation of a touch panel, a touch switch, or the like, a haptics technology has also been adopted in which tactile feedback due to a vibration is given to a human fingertip to prevent operation mistakes and improve operability (see, for example, Japanese Patent No. 5597452).

In the field of an in-vehicle device, in addition to car navigation of related art, an in-vehicle system including cooperation with smartphones or the like, an Internet connection function, or the like has been adopted, and also in a display device, adoption of a touch panel as a user interface is expanding. Even in such an in-vehicle system, it is conceivable to improve the operability using the touch panel employing the tactile feedback.

SUMMARY

The touch panel used in the in-vehicle system is fixedly installed at an appropriate place such as a dashboard, and vibrates relatively greatly with traveling of a vehicle. Therefore, there is a problem that a user who rides in the vehicle and operates the touch panel while vibrating similarly hardly feels a vibration due to the tactile feedback, and it is difficult to obtain appropriate tactile feedback.

The present disclosure has been made in view of the above-described circumstances, and an object thereof is to provide an input device and a sound output system capable of allowing an operator to feel appropriate tactile feedback such as an operational feeling similar to that of a physical button, for example.

According to the present disclosure, there is provided an input device including: a touch device configured to receive a user operation; an actuator configured to apply a vibration corresponding to a drive voltage to the touch device; and a processor configured to: apply a first voltage as the drive voltage to the actuator to vibrate the touch device with a first vibration in response to a touch-down during a touch operation, the touch-down in which a pressing force of a predetermined value or more is detected from start of touch to the touch device; and apply a second voltage as the drive voltage, the second voltage being lower than the first voltage, to the actuator to vibrate the touch device with a second vibration in response to a touch release during the touch operation, the touch release in which a pressing force of a value lower than the predetermined value after the touch-down is detected.

According to the present disclosure, there is provided a sound output system including: an input device including a touch device configured to receive a user operation, an actuator configured to apply a vibration corresponding to a drive voltage to the touch device, and a processor configured to control driving of the actuator; a receiver configured to receive a radio signal and acquire a reception signal of the radio signal; and a sound output device configured to reproduce and output an audio signal based on the radio signal. The processor is configured to: apply a first voltage as the drive voltage to the actuator to vibrate the touch device with a first vibration in response to a touch-down during a touch operation, the touch-down in which a pressing force of a predetermined value or more is detected from start of touch to the touch device; apply a second voltage as the drive voltage, the second voltage being lower than the first voltage to the actuator to vibrate the touch device with a second vibration in response to a touch release during the touch operation, the touch release in which a pressing force of a value lower than the predetermined value after the touch-down is detected; and perform a mute processing on the audio signal when the first vibration is generated.

According to the present disclosure, an operator can feel appropriate tactile feedback such as an operational feeling similar to that of a physical button, for example.

DETAILED DESCRIPTION

Hereinafter, embodiments of an input device and a sound output system according to the present disclosure will be described in detail with reference to the accompanying drawings. However, unnecessarily detailed description may be omitted. For example, a detailed description of a well-known matter or a repeated description of substantially the same configuration may be omitted. This is to avoid unnecessary redundancy in the following description and to facilitate understanding by those skilled in the art. It should be noted that the accompanying drawings and the following description are provided for a thorough understanding of the present disclosure by those skilled in the art, and are not intended to limit the subject matter recited in the claims.

First Embodiment

In the following first embodiment, an example in which a sound output system including an input device according to the present disclosure is adopted for in-vehicle use will be described. In the first embodiment, in order to obtain the same operational feeling as an operational feeling with respect to a physical button, a first vibration is applied to a touch device when push operation of a touch operation is performed on the touch device such as an operation panel, and a second vibration having a smaller vibration amplitude than the first vibration is applied to the touch device during a release operation (before separating) of the touch operation.

In the following description, an example in which the sound output system including the input device is applied to a touch panel on a display adopted in an in-vehicle system will be described, but the present disclosure is not limited thereto, and may be applied to a touchpad provided separately from a display of a display device or various touch switches other than a display panel, such as an operation panel of an air conditioner. Further, the present disclosure is not limited to being mounted on a vehicle, and can be applied to an electronic device such as a smartphone and a tablet terminal, various touch switches such as wall switches for lighting, a touch panel, a touchpad, or the like.

Figure 1:
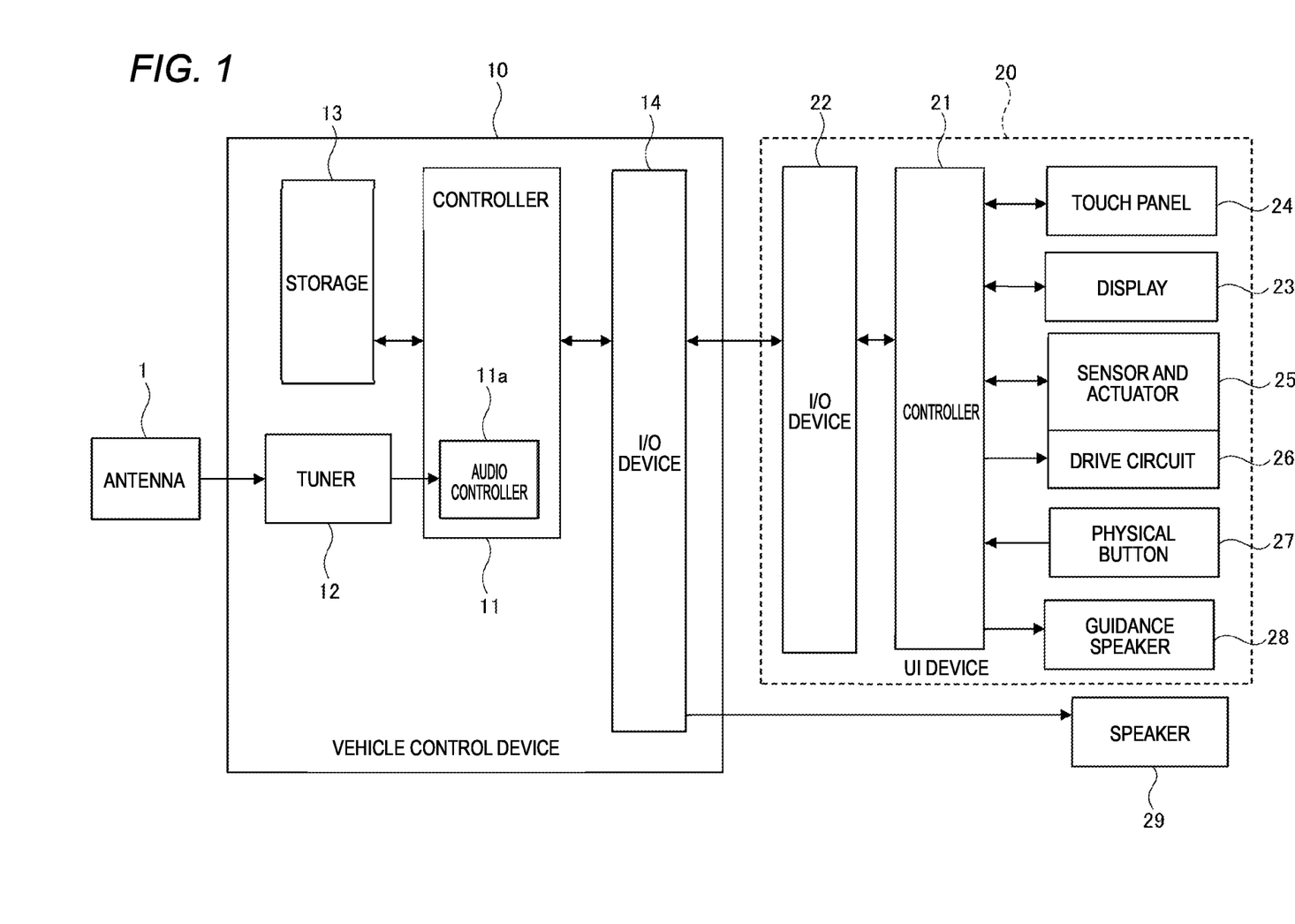
FIG. 1 is a block diagram showing an example of a sound output system including an input device according to a first embodiment.

FIG. 1 is a block diagram showing an example of the sound output system including the input device according to the first embodiment. The sound output system of FIG. 1 mainly includes a vehicle control device 10, a user interface device (hereinafter referred to as a UI device) 20, and a speaker 29.

Although the vehicle control device 10 performs various controls relating to the vehicle, for example, an engine control and various controls relating to electric communication of a vehicle, FIG. 1 shows only a configuration relating to a audio processing. The vehicle control device 10 includes a controller 11, a tuner 12, a storage 13, and an input/output (I/O) device 14. An antenna 1 for receiving a radio signal such as a broadcast signal is connected to the vehicle control device 10. In the present embodiment, a configuration in which a broadcast signal of a radio, a television, or the like is received and sound is reproduced will be described.

The antenna 1 is disposed on a glass surface, a roof, or the like of the vehicle (not shown), receives the broadcast signal, and outputs a reception signal to the tuner 12 of the vehicle control device 10. The tuner 12 selects a channel corresponding to a user operation, acquires a reception signal of a desired station, and outputs the reception signal of the broadcast signal to the controller 11. An example of a receiver is configured by the antenna 1 and the tuner 12.

The controller 11 controls each unit of the vehicle control device 10 and the UI device 20. The controller 11 may be configured by a processor using a CPU or the like, may operate in accordance with a program stored in the storage 13 to control each unit, or may have a part or all of functions thereof replaced by hardware. The controller 11 is configured to have a function of an audio controller 11a that performs an audio control.

The audio controller 11a may be configured by hardware different from that of the controller 11, or may be configured by, for example, a digital signal processor (DSP) or the like.

The audio controller 11a performs a predetermined audio signal processing on the audio signal included in the input broadcast signal and outputs the audio signal. In addition, the audio controller 11a can be controlled by the controller 11 to generate and output predetermined sound, for example, a warning sound, a message sound, or the like. Further, the audio controller 11a can adjust and output an audio signal level of the output sound so as to have a volume based on a user operation, for example.

An audio signal from the audio controller 11a is supplied to the speaker 29 via the I/O device 14. The I/O device 14 is an interface that transmits various signals including a control signal from the controller 11 to each unit in the vehicle and transmits various signals from each unit of the vehicle to the controller 11, in addition to the transmission of the audio signal. The signal from the controller 11 can be supplied to the UI device 20 via the I/O device 14. The speaker 29 reproduces and outputs sound based on the input audio signal. The audio controller 11a, the I/O device 14, and the speaker 29 constitute an example of a sound output device that reproduces and outputs an audio signal.

The UI device 20 includes a controller 21, an I/O device 22, a touch panel 24, a display 23, a sensor and actuator 25, a drive circuit 26, a physical button 27, and a guidance speaker 28. The UI device 20 is disposed at a position where a user, as an operator, can operate and a position where information can be provided to the user, for example, in a vehicle interior or the like, and receives a user operation and provides various information to the user.

The controller 21 of the UI device 20 controls each unit of the UI device 20 based on a control signal from the controller 11 of the vehicle control device 10. The controller 21 may be configured by a processor using a CPU or the like, and may operate in accordance with a program stored in a memory (not shown) to control each unit. The controller 21 can communicate with the controller 11 via the I/O device 22 and the I/O device 14.

The display 23 is installed in an appropriate place such as a dashboard or a ceiling in the vehicle interior, and functions as a display device for displaying various information. The display 23 can be configured by a display panel device such as a liquid crystal display or an organic electro-luminescence (EL) display, and can display an image supplied from the controller 21 on a display screen. For example, in a case where a television broadcast signal is selected by the tuner 12, the controller 21 can be supplied with a video signal from the controller 11 via the I/O device 14 and the I/O device 22, and can display a display based on the video signal on the display screen of the display 23. In addition, the controller 21 can also display information displays such as various menu displays, reception channels, and program contents on the display screen of the display 23.

The physical button 27 provided in the UI device 20 receives various operation inputs from the user. For example, the physical button 27 includes physical buttons such as a button for adjusting a sound volume of the sound output from the guidance speaker 28 and the speaker 29, a channel selection button, and a menu button. The guidance speaker 28 is controlled by the controller 21 and is configured to output guidance sound and a sound effect.

The touch panel 24, which is an example of a touch device, is disposed on the display screen of the display 23. As the touch panel 24, for example, a touch panel of each type such as a resistive film type or a capacitance type can be used. The touch panel 24 can generate an operation signal corresponding to a position on the display screen of the display 23 touched by the user with a finger. This operation signal is supplied to the controller 21. Accordingly, in a case where the user touches the display screen, the controller 21 can acquire information on a touch position of the user. Incidentally, the controller 21 can also detect various operations such as a sliding operation of the user on the touch panel 24, a sliding direction, a swipe operation, a touching period, and a touch area of a finger at the time of a touch operation. The controller 21 can execute a processing corresponding to the user operation on the touch panel 24.

In the present embodiment, the sensor and actuator 25 is attached to the touch panel 24. The sensor and actuator 25 has a function as an actuator, and is configured to apply one or more types of predetermined vibrations to the touch panel 24 corresponding to a drive voltage. The drive circuit 26 is controlled by the controller 21, and is configured to generate a drive voltage for driving the sensor and actuator 25. The sensor and actuator 25 is applied with a drive voltage from the drive circuit 26, and the vibrations corresponding to the drive voltage can be applied to the touch panel 24.

The sensor and actuator 25 can vibrate the touch panel 24 in a direction perpendicular to a surface thereof, for example, and gives the touch panel 24 a vibration having an amplitude corresponding to the drive voltage from the drive circuit 26.

The sensor and actuator 25 has a function as a detector, and can also detect a strength of pressing of the touch operation on the touch panel 24 by the user. For example, the sensor and actuator 25 is configured to detect a force or a pressure (hereinafter, referred to as a pressing force) for pressing the touch panel 24 by the user. The sensor and actuator 25 successively detects the pressing force on the touch panel 24, and outputs information on the detected pressing force to the controller 21.

In response to the detected pressing force, the controller 21 detects a process of the user operating the touch panel 24, that is, states of touching, pushing, weakening (releasing) a pushing force, and separating. For example, the controller 21 determines that the touch is started (touching) when application of the pressing force is started from a state in which the touch panel 24 is not pressed. The controller 21 determines that touch-down (pushing) is performed when a pressing force equal to or greater than a first threshold value is detected from the touch start. In addition, the controller 21 determines that the touch is released when the pressing force is lower than a second threshold value after the touch-down determination. Further, the controller 21 determines that the touch has ended (separating) when the pressing force on the touch panel 24 cannot be detected from the touch release determination.

In the present embodiment, the controller 21 controls the drive circuit 26 so as to generate a drive voltage of a first voltage for a predetermined period when the touch-down is detected and to generate a drive voltage of a second voltage for a predetermined period when the touch release is detected, and so as not to generate a drive voltage during other periods. Then, the controller 21 controls the drive circuit 26 such that the first voltage is greater than the predetermined voltage and the second voltage is lower than the first voltage, that is, the drive voltage becomes a first voltage V1>a second voltage V2.

The drive circuit 26 applies the generated drive voltage to the sensor and actuator 25 to vibrate the touch panel 24. Therefore, the touch panel 24 vibrates at an amplitude corresponding to the first voltage for the predetermined period when the touch-down is detected, and vibrates at an amplitude corresponding to the second voltage for the predetermined period when the touch release is detected. That is, the touch panel 24 vibrates at a relatively large amplitude when the user starts the touch operation and the pressing force increases, and vibrates at a relatively small amplitude when the user weakens the pressing force of the touch operation and releases the touch.

In the present embodiment, when the user performs the touch operation, the user can obtain the same operational feeling as that of the physical button by applying the touch panel 24 with two different vibrations (also referred to as a first vibration and a second vibration, respectively) in which the amplitude of the first vibration is large and the amplitude of the second vibration is small. In general, the first vibration generated when the touch operation is in a pushing state has a relatively large influence on a degree of recognition of the user who performed the operation. Therefore, like the in-vehicle system, even when the user and the in-vehicle device such as the UI device 20 moves with the traveling of the vehicle and the in-vehicle device is equipped with a large-sized touch panel, it is necessary to apply a sufficiently large vibration to the touch panel so as to obtain tactile feedback that can be recognized by the user.

Therefore, the controller 21 drives the sensor and actuator 25 by the first voltage that is the drive voltage equal to or greater than the predetermined voltage, and applies the touch panel 24 with the first vibration having the sufficiently large amplitude so as to obtain appropriate tactile feedback when the push operation is performed. On the other hand, the second vibration generated immediately before the separating of the touch operation has a relatively large influence on quality of the feeling of the touch operation. Therefore, the controller 21 drives the sensor and actuator 25 by the second voltage smaller than the first voltage, and applies the touch panel 24 with the second vibration having the amplitude smaller than the first vibration so as to obtain the appropriate tactile feedback at the time of separating. Accordingly, the same operational feeling as that of the physical button can be obtained by the two vibrations of the first vibration and the second vibration, the degree of recognition of the operation can be improved by increasing the amplitude of the first vibration, and the quality of the feeling can be improved by the second vibration.

By providing the tactile feedback as described above, the user can obtain a sufficient operational feeling even if the touch panel 24 is not vibrated with an amplitude larger than necessary. As a result, it is possible to reduce a size of the device including the sensor and actuator 25 and the drive circuit 26.

Although an example in which the sensor and actuator 25 integrated with the actuator is used as the sensor for detecting the pressing force of the touch operation has been described in the above description, the actuator for driving the touch panel 24 and the sensor for detecting the pressing force on the touch panel 24 may be configured separately.

In the above description, as a method of detecting the strength of the pressing of the touch operation by the user, it has been described that the force or the pressure for pressing the touch panel 24 is detected, but the strength of the pressing of the touch operation can also be determined by an area of the fingertip touching the touch panel 24. In this case, the touch panel 24 outputs a detection result of a portion touching the surface of the touch panel 24 to the controller 21. The controller 21 detects the area of the touch device of the finger. Accordingly, the controller 21 detects the strength of the operation of the user on the touch panel 24, that is, the pressing force and an operation state, in accordance with the detected touch area. That is, the controller 21 determines that the touch is started when the touch is started from a state in which the finger does not touch the touch panel 24. Further, the controller 21 determines that the touch-down is performed when the touch area equal to or larger than a predetermined first area is detected from the touch start. Further, the controller 21 determines that the touch is released when the touch area becomes smaller than a predetermined second area after the touch-down determination. In addition, the controller 21 determines that the touch has ended when the touch to the touch panel 24 cannot be detected from the touch release determination.

In a case where the strength of the pressing of the touch operation is detected using the output of the touch panel 24, an actuator that does not have a sensor function can be used instead of the sensor and actuator 25. In addition, the detection results of both the detection of the pressing force by the sensor and actuator 25 and the detection of the touch area by the touch panel 24 may be used to determine each stage of the touch operation by the user.

In the following description, an example in which the pressing force is detected will be described as the method of detecting the strength of the touch operation, but a method of detecting the touch area of the touch may be used.

Figure 2:
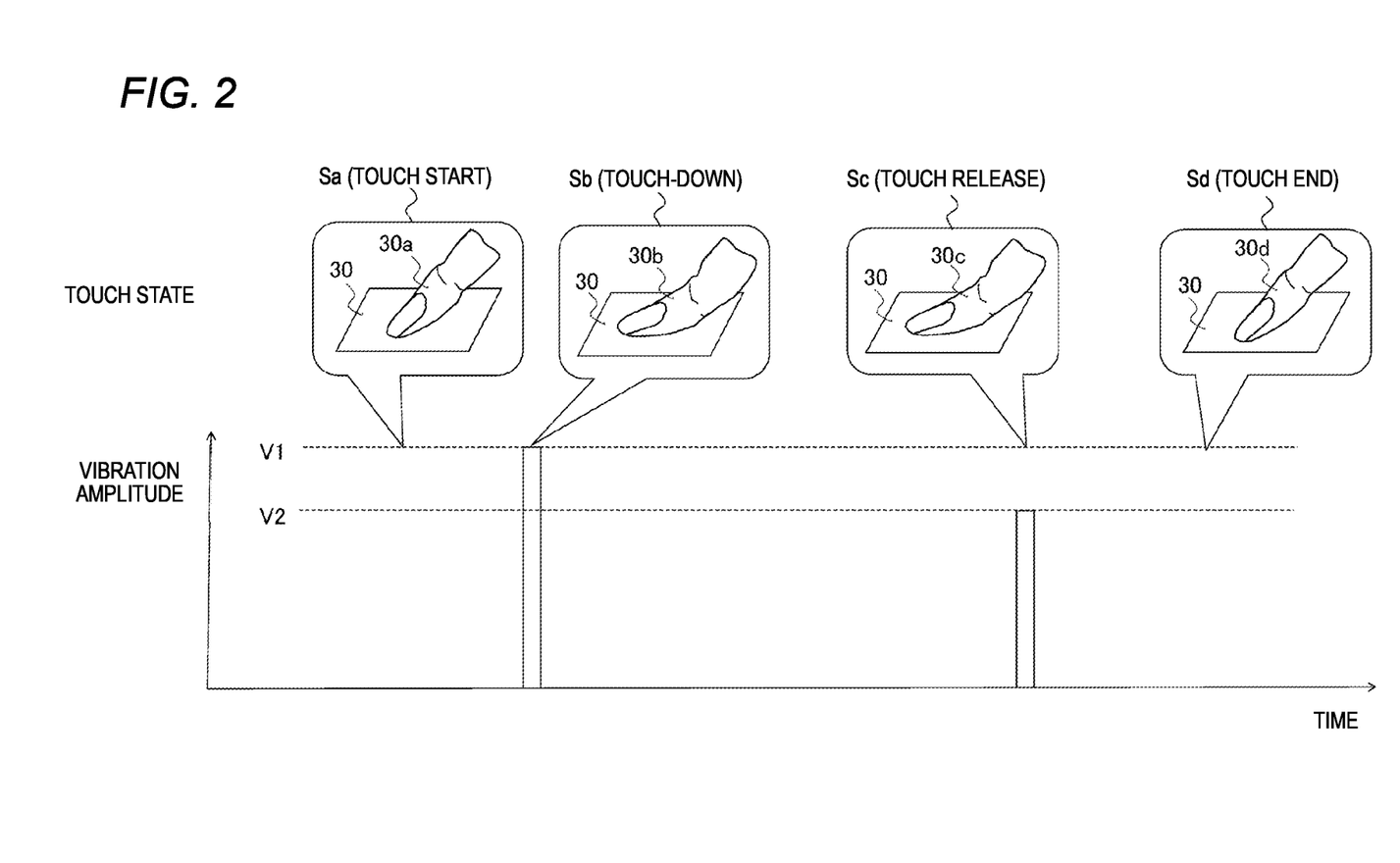
FIG. 2 is a diagram showing an operation of the first embodiment.

Next, an operation of the first embodiment configured as described above will be described with reference to FIG. 2. FIG. 2 is a diagram showing the operation of the first embodiment. FIG. 2 shows a change in a touch state and a change in the amplitude of the vibration of the touch panel 24, with a horizontal axis representing time. Although the vibration of the touch panel 24 actually changes like an alternating current, the maximum value of the amplitude of the vibration at each time is shown as an envelope in FIG. 2.

Here, it is assumed that the user performs the touch operation on the touch panel 24 disposed on the display 23 for some operation. The touch state in FIG. 2 indicates a change in the touch operation in a predetermined area 30 of the touch panel 24. The touch states Sa to Sd in FIG. 2 respectively indicate the states of fingers 30*a* to 30*d* at the touch start, the touch-down, the touch release, or the touch end, which are the process of the touch operation of the finger of the same person.

In a case where the touch operation of the user is in the touch state Sa, that is, when the finger 30*a* of the user lightly touches the area 30 of the touch panel 24, the sensor and actuator 25 detects the touch operation of the user and outputs the detection result to the controller 21. Accordingly, the controller 21 determines the touch start.

Next, it is assumed that the user further pushes the finger 30*a* into the touch state Sb indicated by the finger 30*b* with a first joint extended. In this case, the sensor and actuator 25 detects the pressing force exceeding the first threshold value from a state in which the pressing force of the touch start is small, and outputs the detection result to the controller 21. As a result, the controller 21 determines that the touch operation of the user is in the touch-down state. Then, the controller 21 causes the drive circuit 26 to generate the first voltage V1 and apply the first voltage V1 to the sensor and actuator 25. The sensor and actuator 25 operates based on the first voltage V1 to vibrate the touch panel 24 at a predetermined cycle. Incidentally, since the amplitude of the vibration of the touch panel 24 corresponds to a voltage value of the drive voltage for driving the sensor and actuator 25 on a one-to-one basis, the amplitudes corresponding to the first voltage V1 and the second voltage V2 are indicated by broken lines in FIG. 2.

In the touch state Sb of FIG. 2, the first vibration having the relatively large amplitude is applied to the touch panel 24. This first vibration causes the user to receive a first relatively large stimulus on the finger 30*b*. The supply of the first voltage to the sensor and actuator 25 ends in the predetermined period, and the first vibration of the touch panel 24 also ends in the predetermined short period.

Next, it is assumed that the user finishes pushing the finger 30*b* and weakens the pressing force on the touch panel 24, and as a result, the touch operation becomes in the touch state Sc indicated by the finger 30*c* with the first joint extended. The pressing force on the touch panel 24 gradually weakens, and at this time point, the sensor and actuator 25 detects the pressing force that is lower than the second threshold value from the state in which the pressing force after the touch-down is large. When the detection result is provided, the controller 21 determines that the touch operation of the user is in the touch release state. The controller 21 causes the drive circuit 26 to generate the second voltage and apply the second voltage to the sensor and actuator 25. The sensor and actuator 25 operates based on the second voltage to vibrate the touch panel 24 at a predetermined cycle.

The second voltage is a voltage lower than the first voltage, and the second vibration having the relatively small amplitude is applied to the touch panel 24 in the touch state Sc of FIG. 2. This second vibration causes the user to receive a second relatively small stimulus on the finger 30*c*. The supply of the second voltage to the sensor and actuator 25 ends in the predetermined period, and the second vibration of the touch panel 24 also ends in the predetermined short period.

Next, the user further weakens the pressing force of the finger 30*c* on the touch panel 24 to separate the finger from the touch panel 24, and the touch operation becomes in the touch state Sd indicated by the finger 30*d*. At this time point, the sensor and actuator 25 cannot detect the pressing force on the touch panel 24, and as a result, the controller 21 determines that the touch operation of the user has ended. In this way, the controller 21 can detect the next touch start.

The operation of the above embodiment has been described as being executed mainly by the controller 21 performing the control, but the present disclosure is not limited thereto. For example, a part or all of the vibration control of the touch panel 24 may be controlled and executed mainly by the controller 11 of the vehicle control device 10.

As described above, in the present embodiment, the touch panel gives the relatively strong stimulus to the user when the touch operation is in the pushing state, and gives the relatively weak stimulus to the user at the time of touch release in which the pushing is weakened. As a result of the user perceiving the stimulus, the user can obtain the same operational feeling as when the physical button is operated, and can obtain high-quality tactile feedback. In addition, since the clear tactile feedback can be obtained even in the touch panel having the relatively large size, a sensation of the touch operation can be felt with the sufficient strength even when the actuator is driven with a relatively small electric power, and the device including the actuator or the like can be reduced in a size even when the present disclosure is adopted for in-vehicle use.

Second Embodiment

Figure 3:
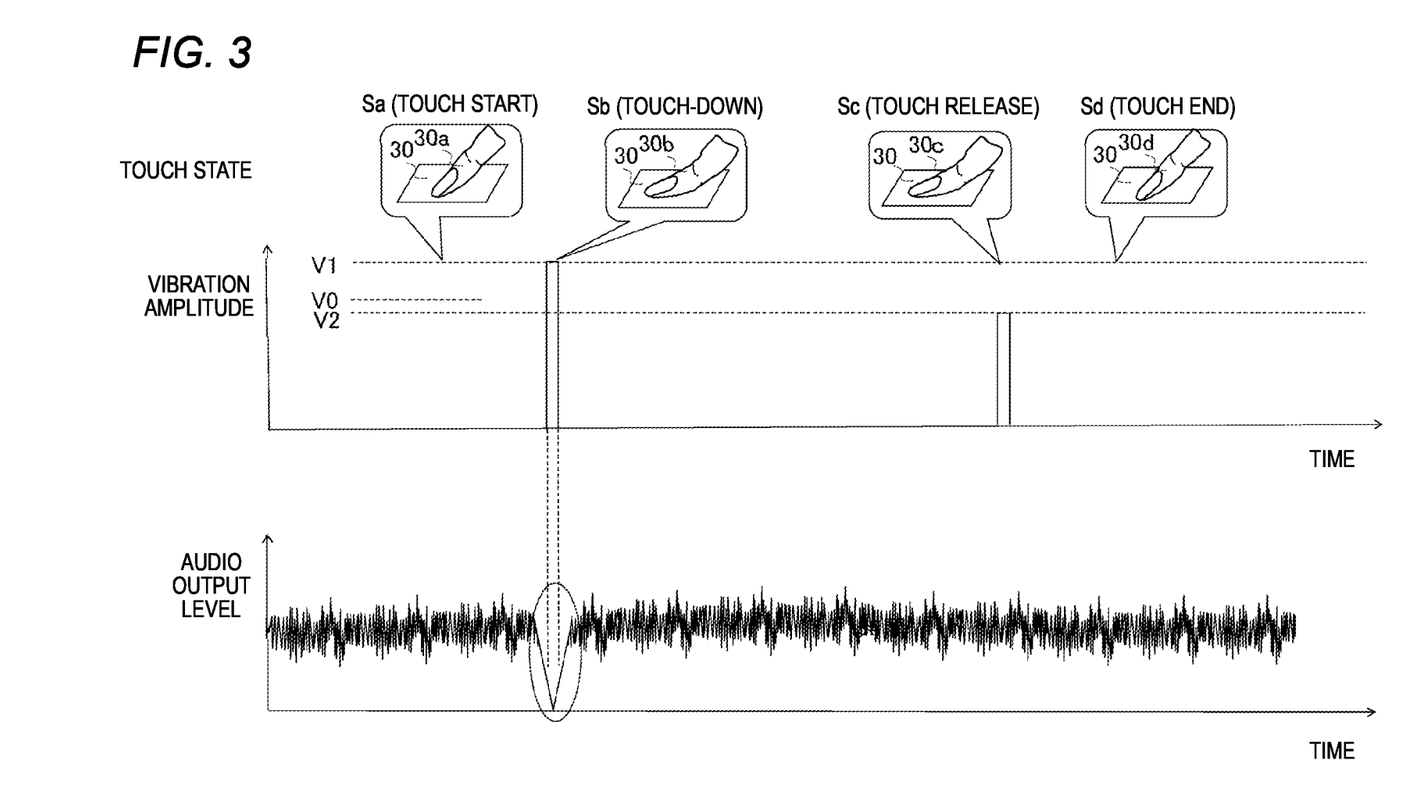
FIG. 3 is a diagram showing an operation of a second embodiment.

FIG. 3 is a diagram showing a second embodiment. FIG. 3 shows the change in the touch state and the change in the amplitude of the vibration of the touch panel 24 and shows an audio output level of the audio signal from the audio controller 11*a* by the same notation method as in FIG. 2, with a horizontal axis representing time. In addition, FIG. 4 is a diagram showing a comparative example for explaining a situation in which noise is mixed into the audio signal by the same notation method as in FIG. 3.

A hardware configuration of the second embodiment is the same as that of the first embodiment. The second embodiment is different from the first embodiment in a method for controlling the drive voltage by the controller 21 and an audio output control of the audio controller 11a.

In the first embodiment, in order to generate the first vibration having the large amplitude, the drive circuit 26 generates the first voltage having a large drive voltage equal to or greater than the predetermined voltage and supplies the first voltage to the sensor and actuator 25. For example, it may be necessary to supply a relatively large drive voltage of about 100 V to 1000 V as the first voltage. In this case, noise may be mixed into the audio signal due to unnecessary radiation generated when the actuator is driven.

Figure 4:
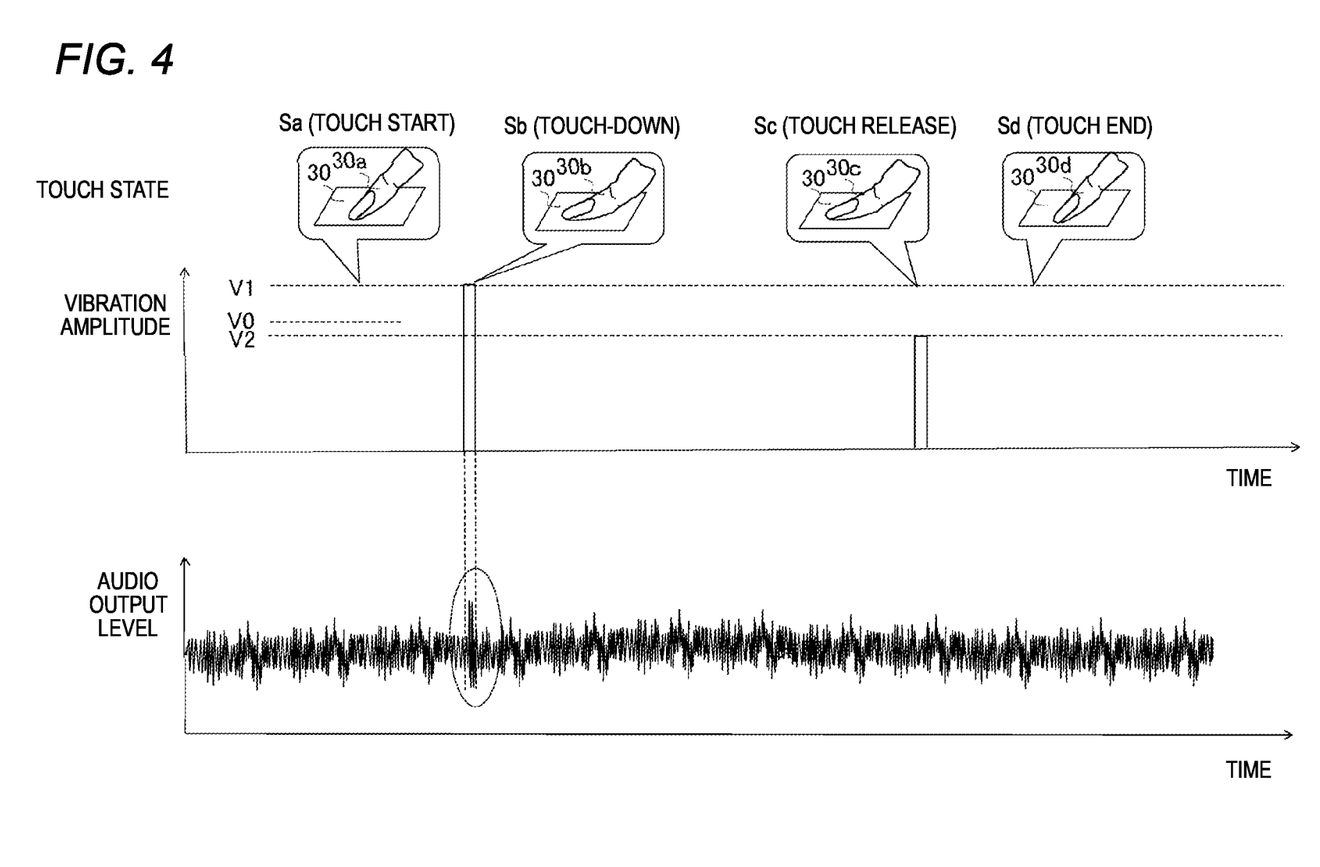
FIG. 4 is a diagram showing a comparative example for explaining a situation in which noise is mixed into an audio signal.

FIG. 4 shows a situation in which the above noise mixing occurs. The comparative example of FIG. 4 shows that noise is mixed into the audio signal from the audio controller 11a as surrounded by a circle at a timing of generation of the first voltage, and noise is included in the sound output reproduced from the speaker 29. Incidentally, in the shown example, it is assumed that noise is not mixed in at a timing of generation of the second voltage.

Therefore, in the second embodiment, levels of the first voltage and the second voltage are set in consideration of a noise level of the audio output and the degree of recognition and the quality of the tactile feedback during the operation, and the audio output is muted at a predetermined timing. As a result, it is possible to obtain the appropriate tactile feedback and at the same time to obtain the audio output without noise interfering with use.

The noise generated by the influence of the drive voltage supplied to the sensor and actuator 25 is particularly relatively large due to the influence of unnecessary radiation from a human body. In the sound output system, it is assumed that the actuator is driven with a drive voltage equal to or greater than a predetermined value when a broadcast signal of a radio, a television, or the like is received and sound is reproduced. In this case, by touching a device body such as the touch panel when the user performs the touch operation, the human body may act as an antenna to generate unnecessary radiation, the unnecessary radiation may be received by the antenna 1, and noise may be mixed into the output audio signal. The noise generated at this time varies depending on the magnitude of the drive voltage of the actuator, a capacitance of the human body performing the touch operation, a positional relationship with the antenna, an antenna gain, a gain of the audio controller, a filter performance, or the like.

Here, in a state in which the sound output system of FIG. 1 is mounted on the vehicle, the user performs the touch operation on the touch panel 24 while changing the drive voltage of the sensor and actuator 25, and the maximum value of the drive voltage, at which the audio output level from the audio controller 11a when no signal is input, that is, the noise level generated in the audio signal in the sound output device is substantially the same between when the touch operation is performed and when the operation is not performed, is set to the threshold voltage V0. The threshold voltage V0 is the maximum value of the drive voltage that does not affect the noise level of the sound output device between when the touch operation is performed and when the operation is not performed. In a case where the sensor and actuator 25 is driven at the threshold voltage V0 or less, there is no change in the audio output level when no signal is input between when the touch operation is performed and when the operation is not performed, the user cannot perceive noise mixing, and the touch operation does not affect the audio signal. Incidentally, the threshold voltage V0 can be obtained experimentally.

In the present embodiment, the controller 21 sets the first voltage V1 giving the first vibration at the time of the touch-down to a voltage higher than the threshold voltage V0, and sets the second voltage V2 giving the second vibration at the time of the touch release to a voltage lower than the threshold voltage V0. That is, the drive voltage is set to V1>V0≥V2. Therefore, in a case where the sensor and actuator 25 is driven at the first voltage V1 higher than the threshold voltage V0, there is a difference equal to or greater than a predetermined value in the detected noise level between when the touch operation is performed and when the touch operation is not performed (non-operation), and noise is perceived in the audio signal when the user performs the touch operation. That is, noise is mixed into the audio signal when the touch operation is performed, and noise is generated in the audio output. The predetermined value of the noise level is a noise level that cannot be detected or cannot be perceived by a person. In addition, in a case where the sensor and actuator 25 is driven at the second voltage V2 equal to or lower than the threshold voltage V0, the difference in the detected noise levels between when the touch operation is performed and when the touch operation is not performed (non-operation) is smaller than the predetermined value, and no noise is perceived in the audio signal when the user performs the touch operation. That is, it can be said that no noise is mixed in the audio signal even when the touch operation is performed.

In general, the audio controller 11a may be not only configured by an audio processor but may be configured by a DSP, and may further include an electronic volume. The control of the output level of the audio signal, including a mute control, may be controlled by any of these configurations. For example, the audio output level can be controlled by software processing of the audio processor or the DSP. In addition, in consideration of a software processing failure at the time of power-on or when abnormality ends, the control of the audio output level may be performed by the electronic volume. In the present embodiment, a method of muting the audio signal is not particularly limited.

The controller 21 determines whether or not the touch operation is in the touch-down state based on the detection result of the sensor and actuator 25 or the touch panel 24, and when it is determined that the touch operation is in the touch-down state, the controller 21 causes the drive circuit 26 to generate the first voltage, and transmits information indicating a generation period of the first voltage to the controller 11 via the I/O device 22 and the I/O device 14. When given the information on the generation period of the first voltage, the audio controller 11a of the controller 11 performs a mute processing of the audio output during the period.

Next, an operation of the second embodiment configured as described above will be described. For example, for the first voltage V1 and the second voltage V2, in accordance with a use condition of the sound output system, the threshold voltage V0 is obtained in advance and is set at a product shipping stage. Also in the second embodiment, the same operation as that of the first embodiment is performed for the detection of each process of the touch operation and the generation of the drive voltage at the first voltage and the second voltage corresponding to the detection result.

The audio controller 11a performs a predetermined signal processing on the audio signal included in the broadcast signal received by the antenna 1 and the tuner 12, and outputs the audio signal. The audio signal is supplied to the speaker 29 via the I/O device 14, and sound based on the broadcast signal is output from the speaker 29. The audio output level in FIG. 3 indicates a level of the audio signal output from the audio controller 11a to the speaker 29.

In the present embodiment, the controller 21 transfers the information indicating the generation period of the first voltage V1 to the controller 11. The audio controller 11a of the controller 11 performs the mute processing of the audio output during the generation period of the first voltage V1. As a result, as shown in the circled portion of FIG. 3, the audio output is muted during the generation period of the first voltage. The first voltage is a voltage higher than the threshold voltage V0 described above, and due to the unnecessary radiation caused by a person performing the touch operation on the touch panel 24, not only the broadcast signal, but also an unnecessary radiation component due to the influence of the first voltage is induced in the antenna 1. Accordingly, the audio signal processed by the audio controller 11a includes a noise component. Even in this case, since the audio controller 11a mutes the audio output during this noise mixing period, noise is not output from the speaker 29.

Since the second voltage is set to a voltage equal to or lower than the threshold voltage V0, noise that can be sensed by a person does not occur during a period in which the second voltage is generated by the touch operation. Therefore, it is possible to suppress noise due to the influence of the touch operation of the touch panel 24 from being generated from the speaker 29 over the entire period after the power is turned on.

In the operation of the above embodiment, the vibration control of the touch panel 24 is controlled and executed mainly by the controller 21, and the mute processing of the audio signal is controlled and executed mainly by the audio controller 11a of the controller 11, but the present disclosure is not limited thereto. For example, a part or all of the vibration control of the touch panel 24 may be controlled and executed mainly by the controller 11 of the vehicle control device 10.

As described above, in the present embodiment, it is possible to apply the large first vibration to the touch panel at the time of the touch-down to improve the degree of recognition of the touch operation of the user, and to prevent the generation of noise due to this operation by the mute processing. In addition, at the time of the touch release, the second vibration using a low drive voltage that is not affected by noise is applied to improve the quality of the operational feeling, and the mute processing for preventing the generation of noise is unnecessary. Therefore, the mute processing for preventing the generation of unpleasant noise that interferes with the use is performed only once during the first vibration, and the appropriate tactile feedback can be obtained while maintaining easiness of listening without giving a sense of discomfort when the user is listening to the sound. Accordingly, in the sound output system, it is possible to realize an operational feeling similar to that of the physical button when operating the touch panel.

Third Embodiment

Figure 5:
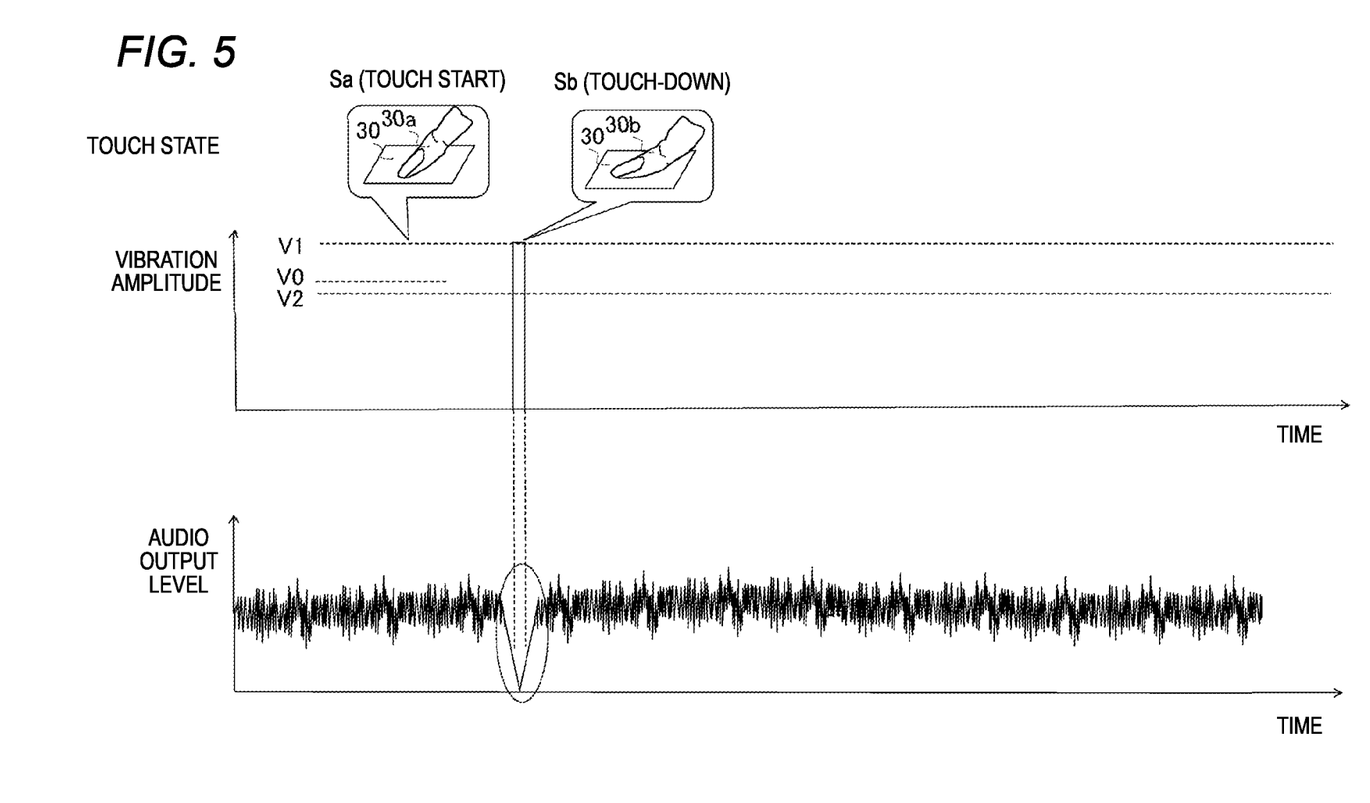
FIG. 5 is a diagram showing a third embodiment.

FIG. 5 is a diagram showing a third embodiment. FIG. 5 shows the change in the touch state and the change in the amplitude of the vibration of the touch panel 24 and shows the audio output level of the audio signal from the audio controller 11a by the same notation method as in FIG. 3, with a horizontal axis representing time. A hardware configuration of the third embodiment is the same as that of the first embodiment. The third embodiment is different from the second embodiment in a method for controlling the drive voltage by the controller 21.

Although an example in which the touch panel 24 is vibrated at the time of the touch-down and touch release has been described in the second embodiment, in the third embodiment, the touch panel 24 is vibrated only at the time of the touch-down. Similarly to the second embodiment, the controller 21 determines the touch-down state based on the detection result of the sensor and actuator 25 or the touch panel 24, causes the drive circuit 26 to generate the first voltage V1 at the time of the touch-down, and applies the first vibration to the touch panel 24. In this case, the drive voltage is set to the first voltage V1 higher than the threshold voltage V0 in the second embodiment. In addition, during the generation period of the first voltage V1, the audio controller 11a performs the mute processing of the audio output as in the second embodiment.

As described above, in the third embodiment, by driving the sensor and actuator 25 by the first voltage, the first vibration having the large amplitude can be applied to the touch panel 24, and the user can obtain the appropriate tactile feedback at the time of the touch-down. In addition, since the audio output is muted at the time of the touch-down, it is possible to prevent the sound containing noise from being output from the speaker 29. Therefore, it is possible to obtain an easy-to-listen sound output in which the generation of noise is prevented, and obtain the appropriate tactile feedback without giving a sense of discomfort when the user is listening to the sound.

In the operation of the above embodiment, the vibration control of the touch panel 24 is controlled and executed mainly by the controller 21, and the mute processing of the audio signal is controlled and executed mainly by the audio controller 11a of the controller 11, but the present disclosure is not limited thereto. For example, a part or all of the vibration control of the touch panel 24 may be controlled and executed mainly by the controller 11 of the vehicle control device 10.

Fourth Embodiment

Figure 6:
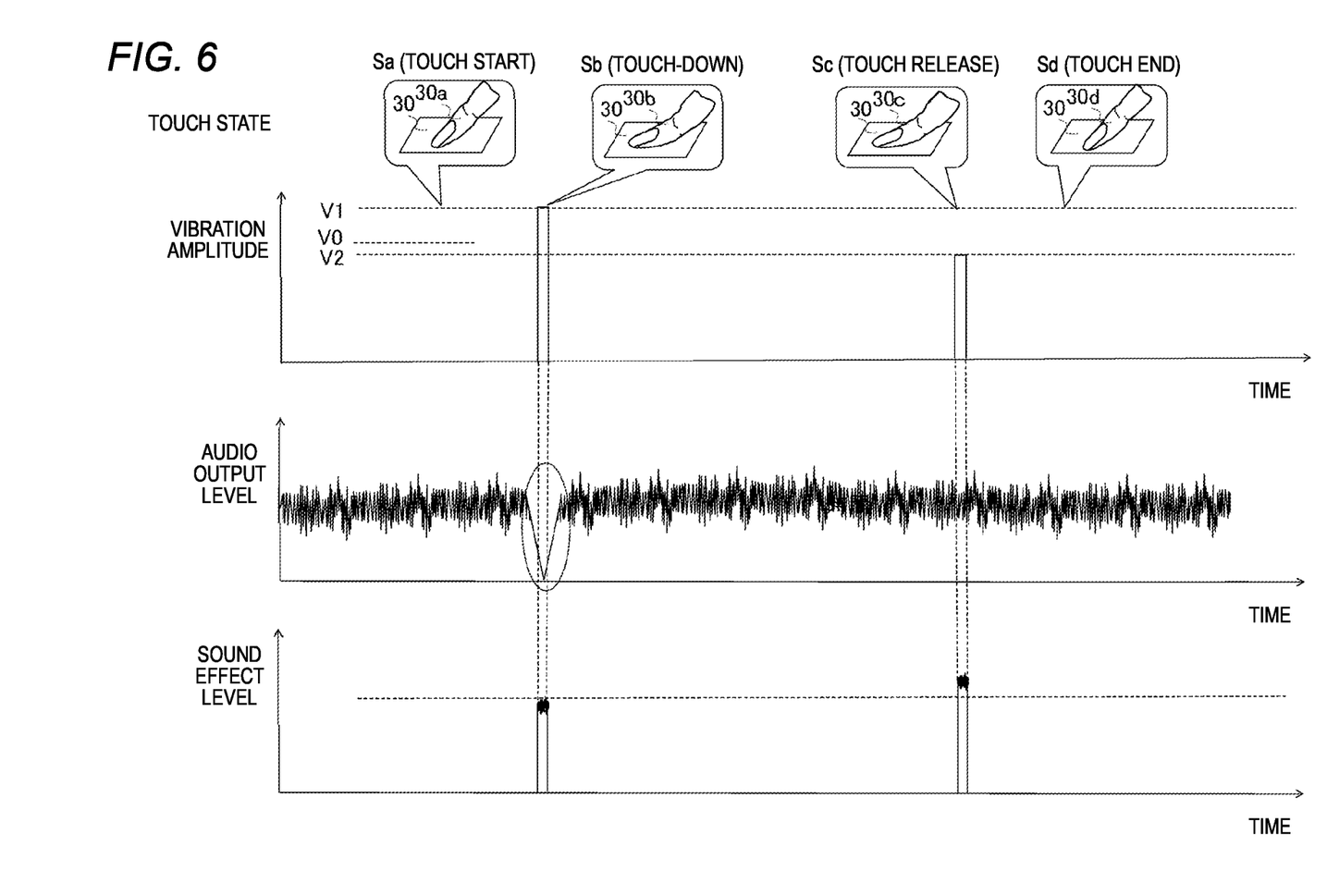
FIG. 6 is a diagram showing a fourth embodiment.

FIG. 6 is a diagram showing the fourth embodiment. FIG. 6 shows the change in the touch state and the change in the amplitude of the vibration of the touch panel 24, shows the audio output level of the audio signal from the audio controller 11a, and shows the sound output level of the guidance speaker 28 by the same notation method as in FIG. 3, with a horizontal axis representing time.

A hardware configuration of the fourth embodiment is the same as that of the first embodiment. The fourth embodiment is different from the second embodiment in an output control of the guidance sound from the guidance speaker 28 by the controller 21.

In general, it is known that the degree of recognition of the operation by the user is improved by adding a sound effect as the same time as the touch operation. Therefore, in the fourth embodiment, by generating the sound effect at the timing of applying the first vibration and the second vibration to the touch panel 24, the degree of recognition of the operation is improved.

Similarly to the second embodiment, the controller 21 determines the touch-down state based on the detection result of the sensor and actuator 25 or the touch panel 24, causes the drive circuit 26 to generate the first voltage V1 at the time of the touch-down, and applies the first vibration to the touch panel 24. In addition, similarly to the second embodiment, the controller 21 determines the touch release state, causes the drive circuit 26 to generate the second voltage V2 at the time of the touch release, and applies the second vibration to the touch panel 24. Further, the controller 21 generates the audio signal of the sound effect and outputs the audio signal to the guidance speaker 28 during the generation period of the first voltage and the generation period of the second voltage.

In this case, the controller 21 makes the output level of the sound effect at the time of the second vibration during the generation period of the second voltage larger than the output level of the sound effect at the time of the first vibration during the generation period of the first voltage. As described above, by increasing the sound effect during the second vibration applied at the time of the touch release, the degree of recognition of the touch operation at the time of the touch release can be improved.

Next, an operation of the fourth embodiment configured as described above will be described. Also in the fourth embodiment, the same operation as that of the second embodiment is performed for the detection of each process of the touch operation, the generation of the drive voltage at the first voltage and the second voltage corresponding to the detection result, and the mute processing of the audio output. In the fourth embodiment, the controller 21 supplies the audio signal of the sound effect of a predetermined level to the guidance speaker 28 during the generation period of the first voltage V1, and supplies the audio signal of the sound effect at a level higher than that in the generation period of the first voltage V1 to the guidance speaker 28 during the generation period of the second voltage V2.

As a result, as shown in FIG. 6, a first sound effect is output as sound from the guidance speaker 28 at the time of the first vibration, and a second sound effect higher than the first sound effect is output as sound from the guidance speaker 28 at the time of the second vibration. That is, the sound effect is output as the sound from the guidance speaker 28 at the same time when the first vibration having the large amplitude is generated, and the user can accurately recognize the operational feeling at the time of the touch-down. In addition, the second sound effect larger than the first sound effect is output as the sound from the guidance speaker 28 when the second vibration is generated, and the degree of recognition of the touch operation at the time of the touch release can be improved.

As described above, according to the present embodiment, the vibration is applied to the touch panel at the time of the touch-down and touch release, and the sound effect is generated at the time of these vibrations, and the degree of recognition of the operation by the user can be improved. In addition, by generating a large sound effect at the time of the second vibration having the second small amplitude, it is possible to sufficiently compensate for a decrease in the degree of recognition of the touch operation and to further improve the tactile feedback effect due to the two vibrations. Accordingly, in the sound output system, it is possible to realize an operational feeling similar to that of the physical button when operating the touch panel.

The operation of the above embodiment has been described as being executed mainly by the controller 21 performing the control, but the present disclosure is not limited thereto. For example, a part or all of the vibration control of the touch panel 24 may be controlled and executed mainly by the controller 11 of the vehicle control device 10.

Although the example in which the fourth embodiment is applied to the second embodiment has been described in the above description, it is apparent that the fourth embodiment may be applied to the first embodiment.

Fifth Embodiment

Figure 7:
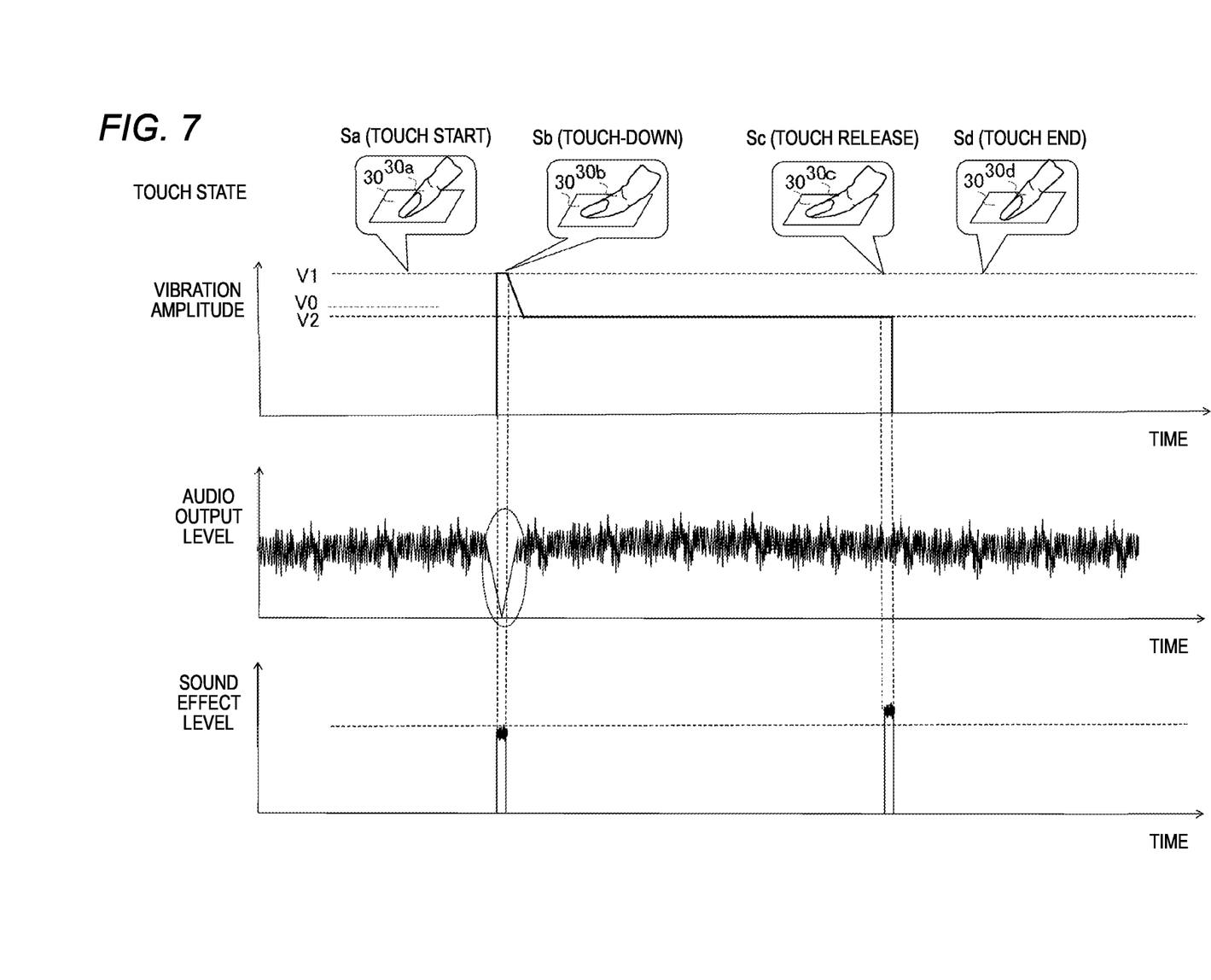
FIG. 7 is a diagram showing a fifth embodiment.

FIG. 7 is a diagram showing the fifth embodiment. FIG. 7 shows the change in the touch state and the change in the amplitude of the vibration of the touch panel 24, shows the audio output level of the audio signal from the audio controller 11a, and shows the sound output level of the guidance speaker 28 by the same notation method as in FIG. 6, with a horizontal axis representing time.

A hardware configuration of the fifth embodiment is the same as that of the first embodiment. The fifth embodiment is different from the fourth embodiment in a control of the drive voltage by the controller 21. In the fifth embodiment, the second vibration is continuously continued after the first vibration in the fourth embodiment in response to a long press operation of the touch panel 24.

In the first to fourth embodiments, the first vibration and the second vibration occur in a relatively short time in a pulse form, whereas in the fifth embodiment, the touch panel 24 is vibrated continuously from the detection of the touch-down to the detection of the touch release.

Similarly to the fourth embodiment, the controller 21 determines the touch-down state and the touch release state based on the detection result of the sensor and actuator 25 or the touch panel 24. When determining the touch-down state, the controller 21 causes the drive circuit 26 to generate the first voltage V1 for the predetermined period, lowers the first voltage V1 to the second voltage V2 after the predetermined period elapses, maintains the second voltage V2 until the touch release is detected, and sets the output voltage of the drive circuit 26 to 0 after a predetermined time has elapsed from the detection of the touch release. Various modes may be used for changing the drive voltage from the first voltage V1 to the second voltage V2, for example, continuously changing in a predetermined curve or linearly, or changing stepwise in predetermined steps.

Next, an operation of the fifth embodiment configured as described above will be described. Also in the fifth embodiment, the same operation as that in the fourth embodiment is performed for a determination method of each process of the touch operation. In the fifth embodiment, the controller 21 lowers the first voltage V1 to the second voltage V2 until the touch release is determined after the predetermined time from the touch-down, for example, after the end of the generation period of the first voltage V1, and controls the drive circuit 26 so as to maintain the generation of the second voltage V2. When determining the touch release state, the controller 21 stops the generation of the drive voltage of the second voltage V2 by the drive circuit 26 after the predetermined time from a touch release time point.

As a result, the sensor and actuator 25 applies the first vibration corresponding to the first voltage V1 to the touch panel 24 at the time of the touch-down. After applying the first vibration to the touch panel 24 for predetermined short time, the sensor and actuator 25 lowers the amplitude of the first vibration and continues to vibrate the touch panel 24 with the amplitude of the second vibration. The sensor and actuator 25 stops applying the second vibration to the touch panel 24 after the predetermined period after the touch release. At this time, the period of the second vibration is longer than the period of the first vibration.

Therefore, in this case, as shown in FIG. 7, it is equivalent to the first vibration having the relatively short time and the second vibration having time longer than the first vibration continuing from the first vibration occurring on the touch panel 24. In this case, the user continuously feels the vibration from the touch-down by a long-press touch operation to the touch release.

Even in this case, since a relatively large first vibration is applied at a first time point of the touch-down, the touch operation can be accurately recognized. In addition, the period of the first vibration is relatively short, and similarly to the second embodiment, in the case of muting noise mixed in this period, it is only necessary to mute the noise in the short time in the audio output. Therefore, it is possible to suppress the easiness of listening to the sound without giving a sense of discomfort when the user is listening to the sound. In the second vibration, the driving is performed at the second voltage V2 lower than the threshold voltage V0, noise is not generated during this period, and interruption of the sound can be prevented by the mute processing. In addition, similarly to the fourth embodiment, by generating the sound effect, the degree of recognition of the touch operation can be improved.

As described above, according to the fifth embodiment, the same effects as those of the second, third, and fourth embodiments can be obtained even when the long-press touch operation is performed. In addition, since the vibration continues from the touch-down to the touch release, sufficient tactile feedback is obtained.

The operation of the above embodiment has been described as being executed mainly by the controller 21 performing the control, but the present disclosure is not limited thereto. For example, a part or all of the vibration control of the touch panel 24 may be controlled and executed mainly by the controller 11 of the vehicle control device 10.

Although the example in which the fifth embodiment is applied to the fourth embodiment has been described in the above description, it is apparent that the fifth embodiment can be applied to any of the above-described embodiments.

As described above, the input device according to the present embodiment includes the touch panel 24 that receives the user operation, the sensor and actuator 25 that applies the vibration corresponding to the drive voltage to the touch panel 24, and the controller 21 or the controller 11 that controls driving of the sensor and actuator 25. The drive circuit 26 generates the drive voltage to drive the sensor and actuator 25. The sensor and actuator 25 vibrates the touch panel 24 corresponding to the drive voltage. The controller 21 or the controller 11 applies the drive voltage of the first voltage V1 to the sensor and actuator 25 to vibrate the touch panel 24 with a first vibration at the time of the touch-down during the touch operation in which the pressing force of the predetermined value or more is detected from the start of touch to the touch panel 24. In addition, the controller 21 or the controller 11 applies the drive voltage of the second voltage V2 that is the voltage lower than the first voltage V1 to the sensor and actuator 25 to vibrate the touch panel 24 with a second vibration at the time of the touch release during the touch operation in which the pressing force of the value lower than the predetermined value after the touch-down is detected.

As a result, the relatively strong stimulus can be given to the user when the touch operation is in the pushing state, and the relatively weak stimulus can be given to the user at the time of the touch release in which the pushing is weakened. Such a stimulus can give the user the same operational feeling as when the physical button is operated, can improve the sufficient degree of recognition of the touch operation and the quality of the operational feeling, and can obtain the appropriate tactile feedback. In addition, since the clear tactile feedback can be obtained even in the touch panel having the relatively large size, the device including the actuator or the like can be reduced in a size even when the present disclosure is adopted for the in-vehicle use.

Regarding the noise level of the audio signal in the sound output device that reproduces and outputs the audio signal, the controller 21 or the controller 11 sets the first voltage V1 to the voltage higher than the threshold voltage V0, and sets the second voltage V2 to be equal to or lower than the threshold voltage V0 in the case where threshold voltage V0 is the maximum value of the drive voltage that does not affect the noise level when the touch panel 24 is touched and not touched. As a result, it is possible to apply the large first vibration to the touch panel at the time of the touch-down to improve the degree of recognition of the touch operation, and to prevent the generation of noise in the audio signal by the mute processing. In addition, at the time of the touch release, the quality of the operational feeling can be improved by the second vibration using the low drive voltage that is not affected by noise.

The sound output system according to the present embodiment includes the input device including the touch panel 24 that receives the user operation, the sensor and actuator 25 that applies the vibration corresponding to the drive voltage to the touch panel 24, and the controller 21 or the controller 11 that controls the driving of the sensor and actuator 25, the antenna 1 and the tuner 12 as an example of the receiver that receives the radio signal and acquires the reception signal of the radio signal, and the audio controller 11a and the speaker 29 as the example of the sound output device that reproduces and outputs the audio signal based on the radio signal. The controller 21 or the controller 11 applies the drive voltage of the first voltage V1 to the sensor and actuator 25 to vibrate the touch panel 24 with first a vibration at the time of the touch-down during the touch operation in which the pressing force of the predetermined value or more is detected from the start of touch to the touch panel 24, and applies the drive voltage of the second voltage V2 that is the voltage lower than the first voltage V1 to the sensor and actuator 25 to vibrate the touch panel 24 with a second vibration at the time of the touch release during the touch operation in which the pressing force of the value lower than the predetermined value after the touch-down is detected. The controller 21 or the controller 11 performs the mute processing on the audio signal when the first vibration is generated.

As a result, it is possible to give the user the same operational feeling as when the physical button is operated, to improve the sufficient degree of recognition of the touch operation and the quality of the operational feeling, and to obtain the appropriate tactile feedback. In addition, even when noise is superimposed on the audio signal based on the reception signal due to the influence of the drive voltage of the relatively high first voltage, the audio signal is muted during the generation period of the first voltage, so that the generation of noise can be prevented, and the noise can be prevented from making it difficult to listen the sound. Therefore, it is possible to obtain the appropriate tactile feedback without giving a sense of discomfort when the user is listening to the sound.

The controller 21 or the controller 11 generates the first vibration for the predetermined time at the time of the touch-down during the touch operation, then continuously generates the second vibration, and stops the second vibration after the predetermined time has elapsed from the touch release during the touch operation. As a result, the vibration having a sufficient length is provided from the touch-down to the touch release, and the user can reliably recognize the tactile feedback for the long-press touch operation.

The controller 21 generates the sound effect together with the first vibration and the second vibration. In addition, the controller generates the first sound effect together with the first vibration at the time of the touch-down, and generates the second sound effect together with the touch release during the second vibration. Such vibration and sound effect can improve the degree of recognition of the touch operation by the user.

The controller 21 makes a volume of the sound effect generated during the second vibration larger than a volume of the first sound effect generated during the first vibration. As a result, the sound effect having the large volume is generated at the time of the second vibration, which is weaker than the first vibration, so that the sufficient degree of recognition of the touch operation can be obtained even during the second vibration.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Each component in the various embodiments described above may be combined arbitrarily in the range without deviating from the spirit of the invention.

The present application is based on a Japanese Patent Application (Japanese Patent Application No. 2018-066240) filed on Mar. 29, 2018, the contents of which are incorporated herein by reference.

The present disclosure is useful as an input device and a sound output system capable of allowing an operator to feel appropriate tactile feedback such as an operational feeling similar to that of a physical button, for example.

The invention claimed is:

1. An input device comprising:
   a touch device configured to receive a user operation;
   an actuator configured to apply a vibration corresponding to a drive voltage to the touch device; and
   a processor configured to:
      apply a first voltage as the drive voltage to the actuator to vibrate the touch device with a first vibration in response to a touch-down during a touch operation, the touch-down in which a pressing force of a predetermined value or more is detected from a start of touch to the touch device; and
      apply a second voltage as the drive voltage, the second voltage being lower than the first voltage, to the actuator to vibrate the touch device with a second vibration in response to a touch release during the touch operation, the touch release in which a pressing force of a value lower than the predetermined value after the touch-down is detected,
   wherein the processor sets the first voltage to be higher than a threshold voltage and sets the second voltage to be equal to or lower than the threshold voltage in a case where the threshold voltage is a maximum value of the drive voltage that does not affect a noise level of an audio signal in a sound output device configured to reproduce and output the audio signal when the touch operation is made and is not made to the touch device.

2. The input device according to claim 1,
   wherein the processor generates sound effects together with the first vibration and the second vibration.

3. The input device according to claim 2,
   wherein the processor makes a volume of a second sound effect generated during the second vibration larger than a volume of a first sound effect generated during the first vibration.

4. The input device according to claim 1,
   wherein the processor generates the first vibration for a predetermined time in response to the touch-down during the touch operation, then continuously generates the second vibration, and stops the second vibration after a predetermined time has elapsed from the touch release during the touch operation.

5. The input device according to claim 4,
   wherein the processor generates a first sound effect together with the first vibration in response to the touch-down, and generates a second sound effect together with the second vibration in response to the touch release.

6. A sound output system comprising:
   an input device comprising a touch device configured to receive a user operation, an actuator configured to apply a vibration corresponding to a drive voltage to the touch device, and a processor configured to control driving of the actuator;
   a receiver configured to receive a radio signal and acquire a reception signal of the radio signal; and
   a sound output device configured to reproduce and output an audio signal based on the radio signal,
   wherein the processor is configured to:
      apply a first voltage as the drive voltage to the actuator to vibrate the touch device with a first vibration in response to a touch-down during a touch operation, the touch-down in which a pressing force of a predetermined value or more is detected from a start of touch to the touch device;
      apply a second voltage as the drive voltage, the second voltage being lower than the first voltage to the actuator to vibrate the touch device with a second vibration in response to a touch release during the touch operation, the touch release in which a pressing force of a value lower than the predetermined value after the touch-down is detected, and
      perform a mute processing on the audio signal when the first vibration is generated.

7. The sound output system according to claim 6,
   wherein the processor sets the first voltage to be higher than a threshold voltage and sets the second voltage to be equal to or lower than the threshold voltage in a case where the threshold voltage is a maximum value of the drive voltage that does not affect a noise level of the audio signal of the sound output device when the touch operation is made and is not made to the touch device.

8. The sound output system according to claim 6,
   wherein the processor generates sound effects together with the first vibration and the second vibration.

9. The sound output system according to claim 8,
   wherein the processor makes a volume of a second sound effect generated during the second vibration larger than a volume of a first sound effect generated during the first vibration.

10. The sound output system according to claim 6,
    wherein the processor generates the first vibration for a predetermined time in response to the touch-down during the touch operation, then continuously generates the second vibration, and stops the second vibration after a predetermined time has elapsed from the touch release during the touch operation.

11. The sound output system according to claim 10,
wherein the processor generates a first sound effect together with the first vibration in response to the touch-down, and generates a second sound effect together with the second vibration in response to the touch release.

12. A non-transitory computer-readable medium storing a program for controlling a system, the system comprising a touch device configured to receive a user operation and an actuator configured to apply a vibration corresponding to a drive voltage to the touch device, the program, when executed by a processor, causing the system to perform operations, the operations comprising:
applying a first voltage as the drive voltage to the actuator to vibrate the touch device with a first vibration in response to a touch-down during a touch operation, the touch-down in which a pressing force of a predetermined value or more is detected from a start of touch to the touch device;
applying a second voltage as the drive voltage, the second voltage being lower than the first voltage, to the actuator to vibrate the touch device with a second vibration in response to a touch release during the touch operation, the touch release in which a pressing force of a value lower than the predetermined value after the touch-down is detected; and
setting the first voltage to be higher than a threshold voltage and setting the second voltage to be equal to or lower than the threshold voltage in a case where the threshold voltage is a maximum value of the drive voltage that does not affect a noise level of an audio signal in a sound output device configured to reproduce and output the audio signal when the touch operation is made and is not made to the touch device.

13. The non-transitory computer-readable medium according to claim 12, wherein the operations further comprise:
generating sound effects together with the first vibration and the second vibration.

14. The non-transitory computer-readable medium according to claim 13, wherein the operations further comprise:
making a volume of a second sound effect generated during the second vibration larger than a volume of a first sound effect generated during the first vibration.

15. The non-transitory computer-readable medium according to claim 2, wherein the operations further comprise:
generating the first vibration for a predetermined time in response to the touch-down during the touch operation, then continuously generating the second vibration, and stopping the second vibration after a predetermined time has elapsed from the touch release during the touch operation.

16. The non-transitory computer-readable medium according to claim 6, wherein the operations further comprise:
generating a first sound effect together with the first vibration in response to the touch-down, and generating a second sound effect together with the second vibration in response to the touch release.

17. The non-transitory computer-readable medium according to claim 12,
wherein the system further comprises a receiver configured to receive a radio signal and acquire a reception signal of the radio signal and the sound output device configured to reproduce and output the audio signal based on the radio signal,
wherein the operations further comprise:
performing a mute processing on the audio signal when the first vibration is generated.

* * * * *